106. COMPOSITIONS, COATING OR PLASTIC

Patented May 28, 1946

2,400,884

UNITED STATES PATENT OFFICE 2,400,884

HEAT-INSULATING MATERIAL

Hubert E. Lloyd, Bound Brook, N. J., assignor to The Ruberoid Co., New York, N. Y., a corporation of New Jersey No Drawing. Application September 29, 1942, Serial No. 460,119

4 Claims. (Cl. 106—75)

This invention relates to a heat insulating material, and more particularly to a molded porous calcarious siliceous material for thermal insulation of steam pipes, boilers, and other heated surfaces.

In my co-pending application Serial No. 441,235, filed April 30, 1942, I have disclosed a light-weight insulating material formed from an aqueous mixture composed principally of calcium silicate with the addition of a hydrophilic colloid, such as bentonite, and asbestos fibres or the like. The aqueous mixture is deposited in molds, and is then set in molded shape by subjecting it to heat in an oven, or preferably both to heat and steam in an autoclave, and dried.

That mixture is not shape-sustaining until after it has been thermo-set, and consequently it has heretofore been necessary to retain the mixture in the molds during the whole time of such setting operation. This has required use of a large number of molds and has involved a considerable capital expenditure.

The principal object of the present invention is to provide a mixture of the type described of such character that it will preset chemically in the mold into shape-sustaining form. This permits of its removal from the mold for subsequent heat treatment and completion of the chemical reaction. The presetting is effected in a relatively short time and accordingly the molds are promptly released for reuse, thus increasing the volume of production without additional investment in molds.

In carrying out the invention, I make an aqueous mixture or slurry of finely divided calcium oxide and silica to which uncalcined bentonite, or similar hydrophilic agent, and asbestos fibres or the like are mixed. Plaster of Paris is added to the mixture to produce a more rapid chemical set, and sodium silicate is added to increase gelling and effect better retention of water. I have found that the best results are obtained with the use of a sodium silicate having a ratio of sodium oxide to silicon dioxide of 1:3.22 although sodium silicate of other ratios may be employed. The combined effect of the addition of plaster of Paris and sodium silicate is to give it presetting and form-sustaining properties that permit of its removal from the mold without deformation.

The mixture is stirred, cooked at a temperature below 212° F. to give it the desired viscous consistency, and then poured into the molds. After remaining for a short period in the mold, the shaped mass is removed therefrom and conveyed to an autoclave or oven where it is subjected to heat treatment to complete the setting reaction, and is subsequently dried.

The following is a typical formula of the mixture:

| | Per cent |
|---|---|
| Water | 83.30 |
| Calcium oxide | 3.50 |
| Silica | 5.00 |
| Bentonite | 2.25 |
| Asbestos fibre | 2.25 |
| Sodium silicate | 2.70 |
| Plaster of Paris | 1.00 |

Various modifications in the formula herein set forth and the procedure described may be made within the spirit and scope of the invention.

What I claim is:

1. A thermo-setting plastic composition for use in molding a lightweight heat insulating material comprising an aqueous mixture of substantially 3.50% calcium oxide, 5.00% silica, 2.25% bentonite, and 2.25% asbestos fibres, with the addition of about 2.70% sodium silicate and 1.00% plaster of Paris to pre-set the composition in a mold and permit of its removal therefrom in shape-sustaining condition prior to thermo-setting.

2. A thermo-setting plastic composition for use in molding a lightweight heat insulating material comprising an aqueous mixture of substantially 3.50% calcium oxide, 5.00% silica, 2.25% bentonite, and 2.25% asbestos fibres, with the addition of an alkali metal silicate and plaster of Paris to pre-set the composition in a mold and permit of its removal therefrom in shape-sustaining condition prior to thermo-setting.

3. A lightweight heat insulating material comprising a thermo-set aqueous mixture of substantially 3.50% calcium oxide, 5.00% silica, 2.25% bentonite, 2.25% asbestos fibre, 2.70% sodium silicate, and 1.00% plaster of Paris.

4. A composition for use in the production of a lightweight molded heat insulating material comprising the following ingredients in substantially the proportions stated based on the wet weight:

| | Per cent |
|---|---|
| Water | 83.30 |
| Calcium oxide | 3.50 |
| Silica | 5.00 |
| Bentonite | 2.25 |
| Asbestos fibre | 2.25 |
| Sodium silicate | 2.70 |
| Plaster of Paris | 1.00 |

HUBERT E. LLOYD.